US008351850B2

(12) United States Patent
Van Aken et al.

(10) Patent No.: US 8,351,850 B2
(45) Date of Patent: Jan. 8, 2013

(54) APPARATUS FOR EMITTING AND RECEIVING RADIO-FREQUENCY SIGNALS, COMPRISING A CIRCUIT TO CANCEL INTERFERENCES

(75) Inventors: Rogier Herman Van Aken, Delfgauw (NL); Jan Martinus Schouten, Lisse (NL); Hubert Langeraar, Hengelo (NL)

(73) Assignee: Thales Nederland B.V., GD Hengelo (NL)

( * ) Notice: Subject to any disclaimer, the term of this patent is extended or adjusted under 35 U.S.C. 154(b) by 139 days.

(21) Appl. No.: 12/751,444

(22) Filed: Mar. 31, 2010

(65) Prior Publication Data

US 2011/0143691 A1 Jun. 16, 2011

(30) Foreign Application Priority Data

Apr. 2, 2009 (EP) ...................................... 09157153

(51) Int. Cl.
*H04B 7/14* (2006.01)
(52) U.S. Cl. .......................................... 455/24; 455/125
(58) Field of Classification Search .................... 455/24, 455/63.1, 67.11, 67.13, 67.14, 114.2, 115.1, 455/115.2, 125, 126
See application file for complete search history.

(56) References Cited

U.S. PATENT DOCUMENTS

| 5,691,978 | A | 11/1997 | Kenworthy |
| 7,095,985 | B1* | 8/2006 | Hofmann ........................ 455/78 |
| 2005/0245216 | A1* | 11/2005 | Boos ............................. 455/129 |
| 2006/0098765 | A1 | 5/2006 | Thomas |
| 2007/0298838 | A1 | 12/2007 | Malaga |
| 2008/0198773 | A1 | 8/2008 | Loh |
| 2009/0207072 | A1* | 8/2009 | Hong et al. .................. 342/194 |

FOREIGN PATENT DOCUMENTS

| JP | 02 094821 | 4/1990 |
| WO | WO 02/17506 A | 2/2002 |
| WO | WO 2007/149957 A1 | 12/2007 |

* cited by examiner

*Primary Examiner* — Ping Hsieh
(74) *Attorney, Agent, or Firm* — Stroock & Stroock & Lavan LLP

(57) ABSTRACT

An apparatus for emitting and receiving radio-frequency signals includes a circuit to cancel interference. The apparatus transmits and receives signals using an antenna, and isolates the transmission and receiving circuitry. The circuit taps a first part of a signal to be transmitted, and controls the amplitude and phase of this signal. The circuit then introduces the first part of the signal into the receiver after the first part of the signal has been amplified and phase-shifted, so as to cancel in the receiver interference due to portions of the signal that have undesirably entered the receiver.

15 Claims, 3 Drawing Sheets

Figure 1:
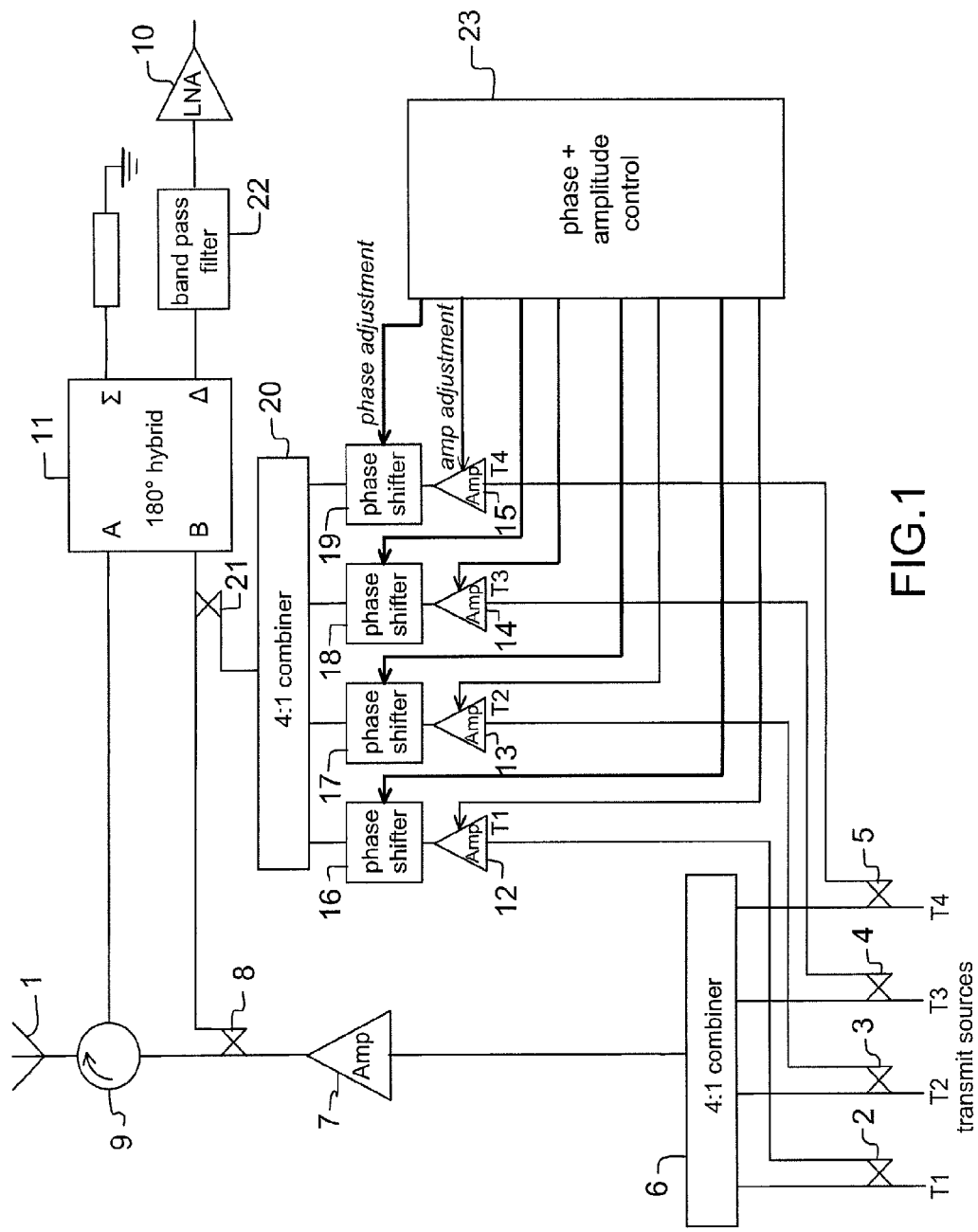

APPARATUS FOR EMITTING AND RECEIVING RADIO-FREQUENCY SIGNALS, COMPRISING A CIRCUIT TO CANCEL INTERFERENCES

Priority is claimed to European Patent Application No. 09157153.9, filed on Apr. 2, 2009, which is hereby incorporated by reference in its entirety.

The present invention relates to an apparatus for emitting and receiving radio-frequency signals, the apparatus comprising a circuit to cancel interferences. For example, the invention is particularly applicable to communication systems.

In full duplex communications systems, signals are received and transmitted simultaneously. The transmitted signals may interfere to the own receive system. Because these signals are in the same frequency band and from a nearby transmitter (hence high power level), they potentially constitute the prime source of interference. As a result, the receiver sensitivity can be significantly reduced, or reception can even become completely impossible.

In a single frequency channel system, this can be solved with filtering. The receiver is tuned to a single frequency and a narrow bandpass filter can be applied that rejects all other frequencies. Thus, interference by the own transmit signal is avoided, provided that there is sufficient frequency separation between the transmit frequency and the receive frequency.

In a broadband system however, such a narrow bandpass filter before the receiver cannot be applied. When the transmit frequencies are in the same frequency band as the receive frequencies, which is quite common, filtering to prevent interferences is not practically possible. This would require a plurality of filters, which would have multiple narrow bandpasses, one for every receive frequency, and which would all have to be tuneable. The construction of such filters would be very difficult and has not yet been demonstrated successfully for a practical application.

A first known solution to prevent interference from the own transmit channels may be to provide sufficient isolation between the transmit antenna and the receive antenna. This cannot always be achieved due to space and/or design constraints. For example, in order to reduce space and weight, the use of a combined transmit/receive antenna may be attractive. In such an arrangement, there is no isolation between the transmit antenna and the receive antenna. In an attempt to limit interferences, a circulator is used to separate the transmit path from the receive path that make use of the same antenna. However, part of the transmit signal leaks through the circulator, typically around −20 decibels (dB). Additionally, the transmit signal that reflects at the antenna simply passes through the circulator and enters the receive path. For an antenna that has a typical standing wave ratio of 2, the reflection is around −10 dB.

A second known solution may be the use of a cancellation circuit, when the isolation between the transmit and the receive antennas or between the transmit and the receive paths is insufficient to prevent the interference problem. The principle is that a signal is added in the receive path. This signal is equal to the unwanted interference signal, but has opposite phase, such that the two signals cancel each other. Moreover, when the cancellation signal is added before the first Low Noise Amplifier (LNA), saturation of this LNA can be prevented. It is worth noting that the phase and the amplitude of the cancellation signal depend on the frequency.

In a passive cancellation circuit, passive components only are used to tap the transmit signal and insert it with the required phase and amplitude into the receive path. The phase and amplitude of the cancellation signal are set in advance, hereby assuming that phase and amplitude of the transmit signal are stable in time, while they are not stable, due to the temperature variations of the cancellation circuit. This sets a practical limit to the amount of cancellation that can be obtained.

As a first example of a passive cancellation circuit, the U.S. Pat. No. 5,691,978 titled "Self-Cancelling Full-Duplex RF Communication System" describes a system in which phase and amplitude are set to fixed values by using matching taps. Actually, no means for adjustment of the phase or amplitude are described. As a consequence, this design is impractical in a system where the frequency of the transmit signal may change and it cannot anticipate to phase and amplitude variations in time. Furthermore, this design is unsuitable for a system with multiple simultaneous transmit signals.

The U.S. Pat. No. 5,815,803 gives another example of a passive cancellation circuit for a system with a combined transmit/receive antenna. The design is such, that it inherently solves the phase and amplitude instability issue. However this circuit only cancels the leakage through the circulator. It does not deal with the transmit signal that reflects at the antenna.

Yet another solution may be the use of an active cancellation circuit, which involves the use of a feedback loop to adjust the cancellation signal. This allows correcting for variations of phase and amplitude in time. The amount of cancellation that is obtained depends on the ability of the feedback loop to follow the signal. Existing designs are mainly for systems where a single frequency signal must be cancelled. However, an active cancellation circuit for multiple simultaneous signals is very difficult to design and has not yet been implemented successfully in practice.

The U.S patent application US 2005/0245216 A1 discloses a transceiver with interference signal rejection, and a method for interference signal rejection. However, the transceiver and the method disclosed in this application deals only with the transmit signal that leaks through the circulator. It does not deal with the transmit signal that reflects at the antenna.

The present invention aims to provide an apparatus for emitting and receiving radio-frequency signals, the apparatus comprising a cancellation circuit, which deals both with the transmit signal that reflects at the antenna and with the transmit signal that leaks through the circulator. For that purpose, the present invention proposes to tap a small part of the transmit signal and to insert it into the receive path with phase and amplitude adjusted. At its most general, the invention provides an apparatus for emitting and receiving radio-frequency signals. It comprises means for transmitting at least one signal by virtue of an antenna, means for receiving signals by the same antenna and means for isolating the means for transmitting from the means for receiving. The apparatus comprises also:
  means for tapping a first part of the signal to be transmitted;
  means for controlling the amplitude and the phase of the first part of the signal;
  means for introducing the first part of the signal in the means for receiving after said first part of the signal has been amplified and phase-shifted, such as to cancel in the means for receiving interferences due to portions of the signal that unwantedly have entered the means for receiving, including the interferences due to the portion of the signal that reflects at the antenna and the interferences due to the portion of the signal that leaks through the means for isolating.

In a preferred embodiment, it may comprise also:
  means for tapping a second part of the signal to be transmitted;

means for introducing the second part of the signal in the means for receiving, such as to cancel to a large extend in the means for receiving interferences due to portions of the signal (T1) that unwantedly have entered the means for receiving.

In a preferred embodiment, the means for introducing the second part of the signal in the means for receiving may comprise a 180 degree hybrid coupler, such as to extract in the means for receiving the unwanted portion of the signal. The means for introducing the first part of the signal in the means for receiving may then comprise a tapper and/or the 180 degree hybrid coupler, such as to extract in the means for receiving the unwanted portion of the signal.

In a preferred embodiment, the means for transmitting may comprise first means for combining, which may be arranged such that a plurality of signals may be transmittable by virtue of the antenna. The apparatus may also comprise a plurality of means for tapping a first part of each of the signals respectively and a plurality of means for controlling the amplitude and the phase of each of the first parts of the signals respectively. The means for introducing the first part of the signal in the means for receiving may comprise second means for combining, which may be arranged such that the first part of each of the signals (T1, T2, T3, T4) may be introduceable in the means for receiving after said first part of the signal has been amplified and phase-shifted.

In a preferred embodiment, the means for controlling the amplitude and the phase of the first part of the signal may comprise means for amplifying and/or means for phase-shifting and/or means for adjusting the gain of the means for amplifying and for adjusting the phase-shift of the means for phase-shifting.

In a preferred embodiment, the means for amplifying may comprise a digital controlled amplifier and/or the means for phase-shifting may comprise a digital controlled phase-shifter.

In a preferred embodiment, the means for adjusting the gain and for adjusting the phase-shift may comprise a look-up table, the look-up table containing a pre-determined amplitude word and a pre-determined phase word in correspondence with the frequency of the signal to be transmitted, the amplitude word and the phase word being provided to the digital controlled amplifier and to the digital controlled phase-shifter to adjust their gain and phase-shift respectively.

Preferably, prior to the use of the apparatus, amplitude words and phase words are determined as a function of the frequency by a calibration method and then stored in the look-up table.

In a preferred embodiment, the means for adjusting the gain and for adjusting the phase-shift may comprise a finite impulse filter, the finite impulse filter receiving signals from the means for receiving after they have been converted into digital, the finite impulse filter being tuned to the frequency of the signal to be transmitted such as to provide to a feedback control unit only the signals at the said frequency, the feedback control unit determining an amplitude word and a phase word suitable for cancelling the signals at the said frequency, the amplitude word and the phase word being provided to the digital controlled amplifier and to the digital controlled phase-shifter to adjust their gain and phase-shift respectively.

In a preferred embodiment, the means for receiving may comprise a band pass filter and a low noise amplifier, the means for transmitting may comprise an amplifier.

Thus, a further advantage provided by a cancellation circuit according to the present invention in any of its aspects is that it is suitable for systems with multiple simultaneous transmit signals, each transmit signal being frequency changing.

Figure 2:
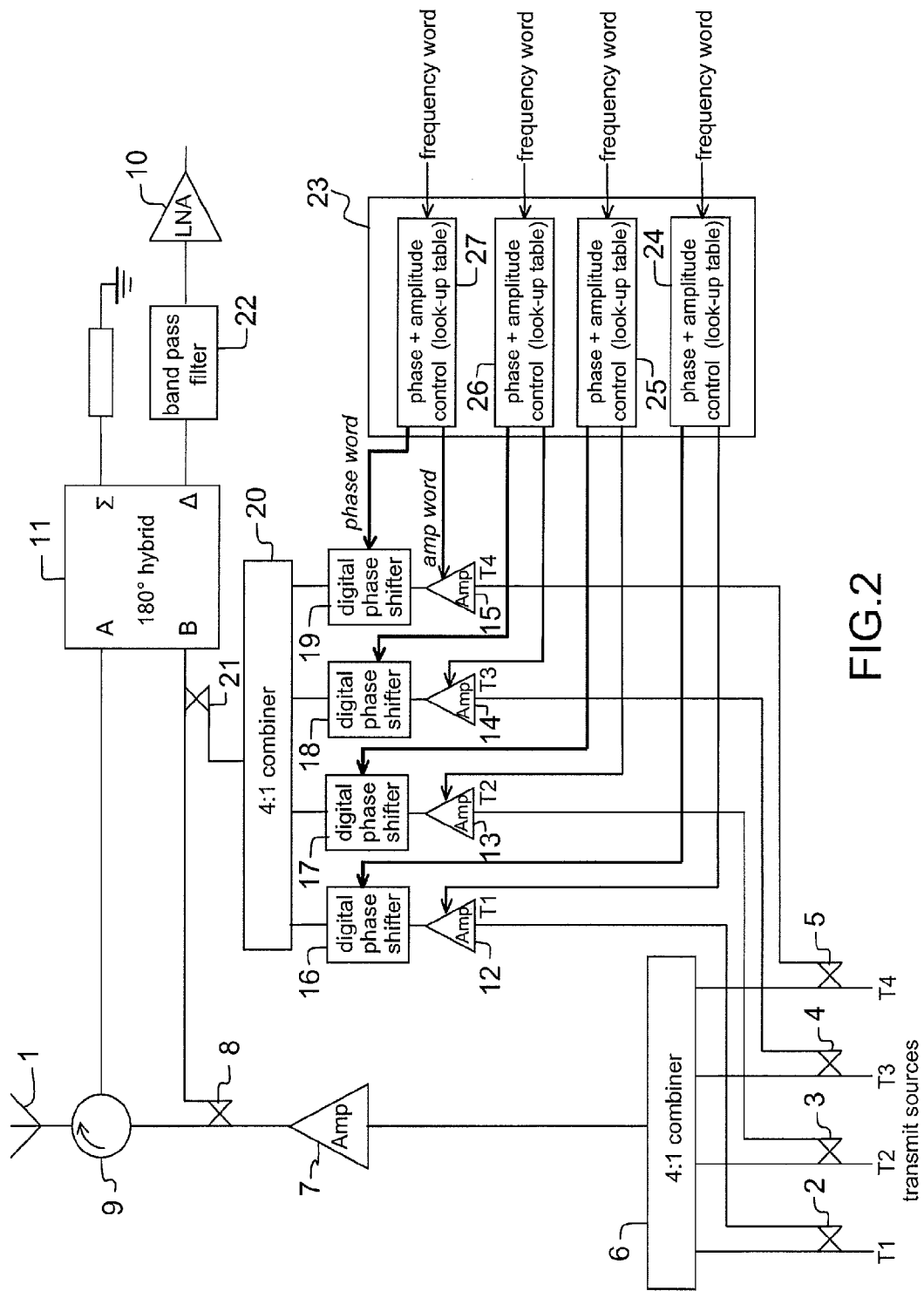
Figure 3:
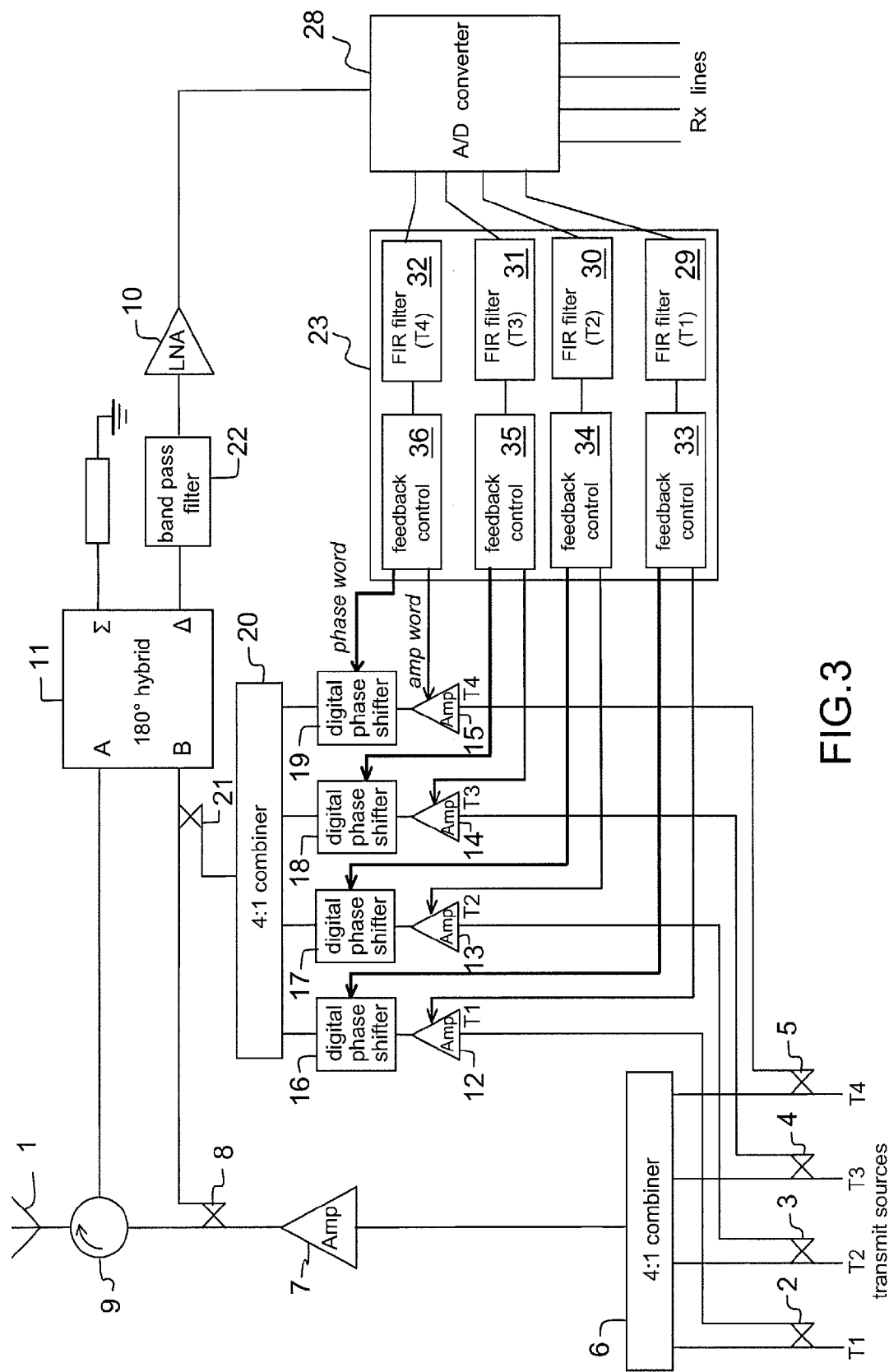

Non-limiting examples of cancellation circuits according to the present invention are described below with reference to the accompanying drawings, in which:

FIG. 1 schematically illustrates the general principle of an apparatus according to the invention;

FIG. 2 schematically illustrates a first exemplary embodiment of a passive cancellation circuit according to the invention;

FIG. 3 schematically illustrates a second exemplary embodiment of an active cancellation circuit according to the invention.

FIG. 1 schematically illustrates the general principle of an apparatus according to the invention. Four transmit sources providing signals T1, T2, T3 and T4 respectively make use of a same antenna 1. It is worth noting that the principle of the invention works with any other number of transmit lines as well. Each signal T1, T2, T3 and T4 passes through a tapper referenced 2, 3, 4 and 5 respectively. Then, the signals T1, T2, T3 and T4 are combined in a combiner 6. Next, the combined signals are amplified by an amplifier 7. In the case where the strength of the combined signals is sufficiently high, the amplifier 7 may be omitted. Alternatively, the signals may also be amplified before they are combined. Afterwards, the combined signals pass through a tapper 8 and a circulator 9, and then are broadcasted via the antenna 1.

The antenna 1 is used for both transmit and receive. The circulator 9 serves for isolating the transmit path from the receive path. The circulator 9 typically gives a transmit-receive isolation of about 20 dB, which means that part of the transmit signal leaks through the circulator 9. Additionally, the transmit signal reflects at the antenna 1 and then enters the receive path. Assuming that the antenna 1 has a typical standing wave ratio of 2, the reflection can be expected around −10 dB. In order to prevent saturation of an LNA 10 arranged in the receive path, these unwanted signals in the receive path can be cancelled as explained below.

The signals that are received by the antenna 1 pass through the circulator 9 and then go to a port A of a 180 degree hybrid coupler 11. Also the transmit signal reflected by the antenna 1 and the direct transmit signal that leaks through the circulator 9 follow this path from the circulator 9 to the port A. By virtue of the tapper 8, part of the transmit signal is tapped and then sent to a port B of the hybrid 11. An output Δ of the hybrid 11 provides the difference between the input on the port A and the input on the port B (A-B). The tapper 8 is chosen such that the tapped signal has approximately the same magnitude as the unwanted signal, such that the two cancel each other to a large extent in A-B. However, complete cancellation of the unwanted signal is not achieved yet, because the magnitude of the transmit signal that reflects at the antenna 1 varies with frequency, while the tapper 8 taps a portion of the transmit signal that essentially is constant versus frequency. Also there may be a phase shift when the transmit signal reflects at the antenna 1. As a consequence, unwanted transmit signals remain in the receive path.

An additional fine tuned cancellation is achieved as follows. Part of each transmit signal T1, T2, T3 and T4 is tapped with tappers 2, 3, 4 and 5 respectively. These signals are each routed to an adjustable amplifier 12, 13, 14 and 15 respectively and to a phase shifter 16, 17, 18 and 19 respectively. Next these signals are combined by a combiner 20 and then inserted into the receive path by virtue of a tapper 21. In the exemplary embodiment of FIG. 1, the signals are inserted before the hybrid 11. However, they may be inserted after the hybrid 11 as well, as long as they are inserted before the LNA 10. The gains of the amplifiers 12, 13, 14 and 15 and the phase shifts of the phase shifters 16, 17, 18 and 19 are adjusted such that the remaining unwanted transmit signals are cancelled. Proper adjustment of the gains and phase shifts is ensured by a control module 23. As a consequence, the Δoutput of the hybrid 11 provides the received signal with the transmit signal cancelled. It is recommended, but not required, to use a bandpass filter 22 before the first LNA 10, to filter unwanted out of band signals. The sum output of the hybrid 11 is terminated with a load to ground.

FIG. 2 schematically illustrates a first exemplary embodiment of a passive cancellation circuit according to the invention, which may make use of look-up tables to adjust the phase and amplitude of the cancellation signals. For each of the signals T1, T2, T3 and T4 that may have to be cancelled in the receive path, the control module 23 may comprise control units 24, 25, 26 and 27 that enable to adjust the gains of the amplifiers 12, 13, 14 and 15 and the phase shifts of the shifters 16, 17, 18 and 19 respectively. For example, a frequency word may be sent to the control unit 24. The frequency word may provide the frequency of the signal T1 that must be cancelled. The control unit 24 may then use a look-up table to find the gain and phase shift that is required for the respective frequency. The gain and the phase shift may be sent in the form of an amplitude word and a phase word to the digital amplifier 12 and to the digital phase shifter 16 respectively. In the present exemplary embodiment of the invention, the amplifiers 12, 13, 14 and 15 and the phase shifters 16, 17, 18 and 19 may be controlled digitally. However, in another embodiment they may be controlled by analogue control signals.

As such, optimum cancellation for every frequency may be achieved. The look-up table can be constructed by applying a calibration method prior to the use of the system. Thanks to this calibration method, the required gain and phase shift can be determined as a function of the frequency. As a result, a complete passive cancellation circuit can be obtained, which may cancel multiple signals at varying frequencies. Because it is a passive circuit, it cannot correct for variations of phase and amplitude in time. However, when the circuit is kept at a constant temperature, phase and amplitude may be constant in time.

FIG. 3 schematically illustrates a second exemplary embodiment of an active cancellation circuit according to the invention, which may use feedback loops to adjust the phase and amplitude of the cancellation signals. The received signal, after it has passed through the LNA 10, may be converted to digital in an Analog-to-Digital (A/D) converter 28. The A/D converter 28 may have four outputs for receive lines. It may also have four outputs for the cancellation circuit, the number of outputs being the same as the number of transmit lines. Each of these four outputs may be connected to a Finite Impulse Response filter (FIR) among 29, 30, 31 and 32. Each of the FIR filters 29, 30, 31 and 32 may be tuned to the frequency of the transmit signal T1, T2, T3 and T4 respectively. Each of the FIR filters 29, 30, 31 and 32 may have its output connected to a feedback control unit 33, 34, 35 and 36 respectively. Each of these control units can detect to what extent its respective transmit signal is cancelled and then may adjust the gain of its respective amplifier and the phase shift of its respective phase shifter appropriately.

In the present embodiment, each of the FIR filters 29, 30, 31 and 32 needs to know the frequency of its respective signal T1, T2, T3 and T4. In order to tune to the correct frequency, the transmit sources require also a frequency control signal. When the transmit sources are controlled by a digital control signal, the same control signal can be used to control the FIR filters. If the control signal for the transmit sources is analogue, A/D converters can be used to create a digital control signal for the FIR filters 29, 30, 31 and 32.

In the present embodiment, the cancellation circuit may work with a digital receive architecture. However, the same principle can also be applied to an analogue receive architecture. The output of the LNA 10 may then be sent to a splitter. The number of outputs of the splitter must be sufficient to cover the number of receive lines and the number of feedback lines, the latter being four in the present example. Each of these four outputs to the feedback circuit may then go to a narrow bandpass filter, which may be set to pass the respective transmit frequency. The output of each narrow bandpass filter may be sent to an analogue feedback control unit, which may then detect to what extent the respective transmit signal is cancelled and then adjust the gain of its respective amplifier and the phase shift of its respective phase shifter appropriately. The amplifier and phase shifter can be controlled with analogue signals from the feedback control unit.

Because a cancellation circuit according to the invention has a cancellation signal for every transmit frequency, it is able to cancel the interference from multiple simultaneous transmit signals. Moreover, for every transmit signal, the phase and amplitude of the cancellation signal are adjusted, for example by making use of a lookup table or a feedback circuit. Thus, the cancellation signal may be adjusted automatically when the transmit frequency is changed.

The invention claimed is:

1. An apparatus for emitting and receiving radio-frequency signals, comprising:
   means for transmitting at least one signal using an antenna;
   means for receiving signals by the antenna;
   means for isolating the means for transmitting from the means for receiving;
   means for tapping a first part of the signal to be transmitted;
   means for controlling amplitude and phase of the first part of the signal;
   means for introducing the first part of the signal in the means for receiving after said first part of the signal has been amplified and phase-shifted, so as to cancel in the means for receiving interference due to portions of the signal to be transmitted that have entered the means for receiving;
   wherein,
   the means for transmitting comprises first means for combining, which is configured such that a plurality of signals are transmittable of using the antenna;
   the apparatus further comprises a plurality of means for tapping a respective first part of each of the respective signals to be transmitted;
   the apparatus further comprises a plurality of means for controlling amplitude and phase of each of the respective first parts of the signals; and
   the means for introducing the first part of the signal in the means for receiving comprises second means for combining, which is configured such that the first part of each of the signals is introduceable in the means for receiving after said first part of each of the signals has been amplified and phase-shifted.

2. The apparatus as claimed in claim 1, further comprising:
   means for tapping a second part of the signal to be transmitted;
   means for introducing the second part of the signal in the means for receiving, so as to cancel in the means for receiving interference due to portions of the signal to be transmitted that have entered the means for receiving.

3. The apparatus as claimed in claim 2, wherein the means for introducing the second part of the signal in the means for receiving comprises a 180 degree hybrid coupler, so as to extract in the means for receiving unwanted portions of a received signal.

4. The apparatus as claimed in claim 3, wherein the means for introducing the first part of the signal in the means for receiving comprises at least one of:
  a tapper, and
  the 180 degree hybrid coupler, so as to extract in the means for receiving the unwanted portions of the received signal.

5. The apparatus as claimed in claim 1, wherein the means for controlling the amplitude and the phase of the first part of the signal comprises at least one of:
  means for amplifying;
  means for phase-shifting; and
  means for adjusting a gain of the means for amplifying and for adjusting a phase-shift of the means for phase-shifting.

6. The apparatus as claimed in claim 5, wherein:
  at least one of the means for amplifying comprises a digital controlled amplifier and the means for phase-shifting comprises a digital controlled phase-shifter.

7. The apparatus as claimed in claim 6, wherein the means for adjusting the gain and for adjusting the phase-shift comprise a look-up table, the look-up table comprising a pre-determined amplitude word and a pre-determined phase word in correspondence with a frequency of the signal to be transmitted, the amplitude word and the phase word being provided to the digital controlled amplifier and to the digital controlled phase-shifter to adjust the gain and the phase-shift, respectively.

8. The apparatus as claimed in claim 7, wherein, prior to use of the apparatus, amplitude words and phase words are determined as a function of frequency by a calibration method and stored in the look-up table.

9. The apparatus as claimed in claim 7, wherein the means for receiving comprises a band pass filter.

10. The apparatus as claimed in claim 7, wherein the means for receiving comprises a low noise amplifier.

11. The apparatus as claimed in claim 7, wherein the means for transmitting comprises an amplifier.

12. The apparatus as claimed in claim 6, wherein the means for adjusting the gain and for adjusting the phase-shift comprise a finite impulse filter, the finite impulse filter receiving signals from the means for receiving after the signals have been converted into digital signals, the finite impulse filter being tuned to a frequency of the signal to be transmitted so as to provide to a feedback control unit only the signals at the said frequency, the feedback control unit determining an amplitude word and a phase word suitable for cancelling the signals at the said frequency, the amplitude word and the phase word being provided to the digital controlled amplifier and to the digital controlled phase-shifter to adjust the gain and the phase-shift, respectively.

13. The apparatus as claimed in claim 12, wherein the means for receiving comprises a band pass filter.

14. The apparatus as claimed in claim 12, wherein the means for receiving comprises a low noise amplifier.

15. The apparatus as claimed in claim 12, wherein the means for transmitting comprises an amplifier.

* * * * *